United States Patent
Sidebottom et al.

(10) Patent No.: US 7,962,633 B1
(45) Date of Patent: Jun. 14, 2011

(54) NETWORK SERVICE MANAGEMENT USING CUSTOMIZABLE BUSINESS-LEVEL RULES

(75) Inventors: Greg Sidebottom, Ottawa (CA); Yue Gao, Ottawa (CA); Siu Jin Foong, Singapore (SG); Hugh Stewart, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 1385 days.

(21) Appl. No.: 11/249,227

(22) Filed: Oct. 13, 2005

(51) Int. Cl.
*G06F 15/16* (2006.01)

(52) U.S. Cl. ............................ 709/229; 726/25; 709/223
(58) Field of Classification Search .................... 709/229
See application file for complete search history.

(56) References Cited

U.S. PATENT DOCUMENTS

| | | | | |
|---|---|---|---|---|
| 4,896,319 | A * | 1/1990 | Lidinsky et al. | 370/427 |
| 6,108,330 | A * | 8/2000 | Bhatia et al. | 370/352 |
| 6,671,818 | B1 * | 12/2003 | Mikurak | 714/4 |
| 6,904,449 | B1 * | 6/2005 | Quinones | 709/203 |
| 6,963,539 | B2 * | 11/2005 | Mukherjee et al. | 370/238 |
| 2002/0078213 | A1 * | 6/2002 | Chang et al. | 709/229 |
| 2003/0212782 | A1 * | 11/2003 | Canali et al. | 709/223 |
| 2004/0064351 | A1 * | 4/2004 | Mikurak | 705/7 |
| 2004/0162901 | A1 * | 8/2004 | Mangipudi et al. | 709/225 |
| 2004/0177139 | A1 * | 9/2004 | Schuba et al. | 709/223 |
| 2004/0255151 | A1 * | 12/2004 | Mei et al. | 713/201 |
| 2005/0038765 | A1 * | 2/2005 | Sterling et al. | 707/1 |
| 2005/0172027 | A1 * | 8/2005 | Castellanos et al. | 709/229 |
| 2005/0177545 | A1 * | 8/2005 | Buco et al. | 707/1 |
| 2005/0256946 | A1 * | 11/2005 | Childress et al. | 709/223 |
| 2005/0278431 | A1 * | 12/2005 | Goldschmidt et al. | 709/207 |
| 2005/0286488 | A1 * | 12/2005 | Briscoe et al. | 370/351 |
| 2006/0021000 | A1 * | 1/2006 | Li et al. | 726/1 |
| 2006/0092833 | A1 * | 5/2006 | Bemmel et al. | 370/229 |
| 2006/0098672 | A1 * | 5/2006 | Schzukin et al. | 370/412 |
| 2006/0178918 | A1 * | 8/2006 | Mikurak | 705/7 |
| 2006/0218302 | A1 * | 9/2006 | Chia et al. | 709/245 |
| 2007/0038762 | A1 * | 2/2007 | Moerdijk | 709/229 |

\* cited by examiner

*Primary Examiner* — Firmin Backer
*Assistant Examiner* — Hamza Algibhah
(74) *Attorney, Agent, or Firm* — Shumaker & Sieffert, P.A.

(57) ABSTRACT

A service deployment device responds to events originating internally or in a network using a set of condition/action rules. The condition/action rules are defined in terms of business-level information. A rules engine in the service deployment device translates the network events to business information and uses a forward-chaining algorithm to evaluate conditions associated with the rules. Based on the evaluation, the service deployment device enables actions associated with the rules. An enterprise using the service deployment device uses the condition/action rules to deploy business policies in the network.

43 Claims, 6 Drawing Sheets

NETWORK SERVICE MANAGEMENT USING CUSTOMIZABLE BUSINESS-LEVEL RULES

TECHNICAL FIELD

The invention relates to computer networks and, in particular, to managing computer networks.

BACKGROUND

A network service provider is an enterprise that supplies some service to users over a computer network. For instance, an Internet Service Provider (ISP) supplies residential or business subscribers with access to the Internet. Service providers often use service level agreements (SLAs) to establish terms of service by which the provider and user of the service are obligated to comply. For example, an ISP and a user might agree that the user will pay a certain amount of money at the beginning of each month in exchange for a fixed number of gigabytes transferred. Policing compliance of agreements between the service provider and the user can be difficult. To enforce the agreements, the service provider needs the capability to monitor the behavior of the user and to take action when the user violates a term of the agreement.

Currently, service providers have little flexibility in their ability to enforce compliance with terms of service. Systems now available provide basic functions, such as the ability to charge accounts in response to usage or by time. Such systems generally operate by collecting and processing long log files. Tailoring such systems to meet the actual business goals of the particular service provider generates significant delay and expense.

SUMMARY

In general, principles of the invention are directed to techniques to define and deploy business policies in a computer network. For example, a Service Deployment Device (SDD) applies a set of business logic rules that cause the SDD to perform actions in response to network-level events pursuant to the business policies of a network service provider. The business logic rules may be defined as condition/action rules specified in terms of high-level business information that "fire" in response to one or more low-level network events.

In one embodiment, a method comprises receiving a set of rules that embody business policies of a network service provider. In addition, the method includes receiving network-level events from a plurality of network devices and performing actions related to services provided by the network service provider by applying the set of rules to the events.

In another embodiment, a system comprises a plurality of network devices coupled to a network that generates network-level events. In addition, the system includes a service deployment device that applies a set of rules to the events to perform actions related to services provided by a network service provider. The rules embody business policies of the network service provider.

In another embodiment, a computer-readable medium comprises instructions. The instructions cause a processor to receive a set of rules that embody business policies of a network service provider. The instructions also cause the processor to receive network-level events from a plurality of network devices. Further, the instructions cause the processor to perform actions related to services provided by the network service provider by applying the set of rules to the events.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
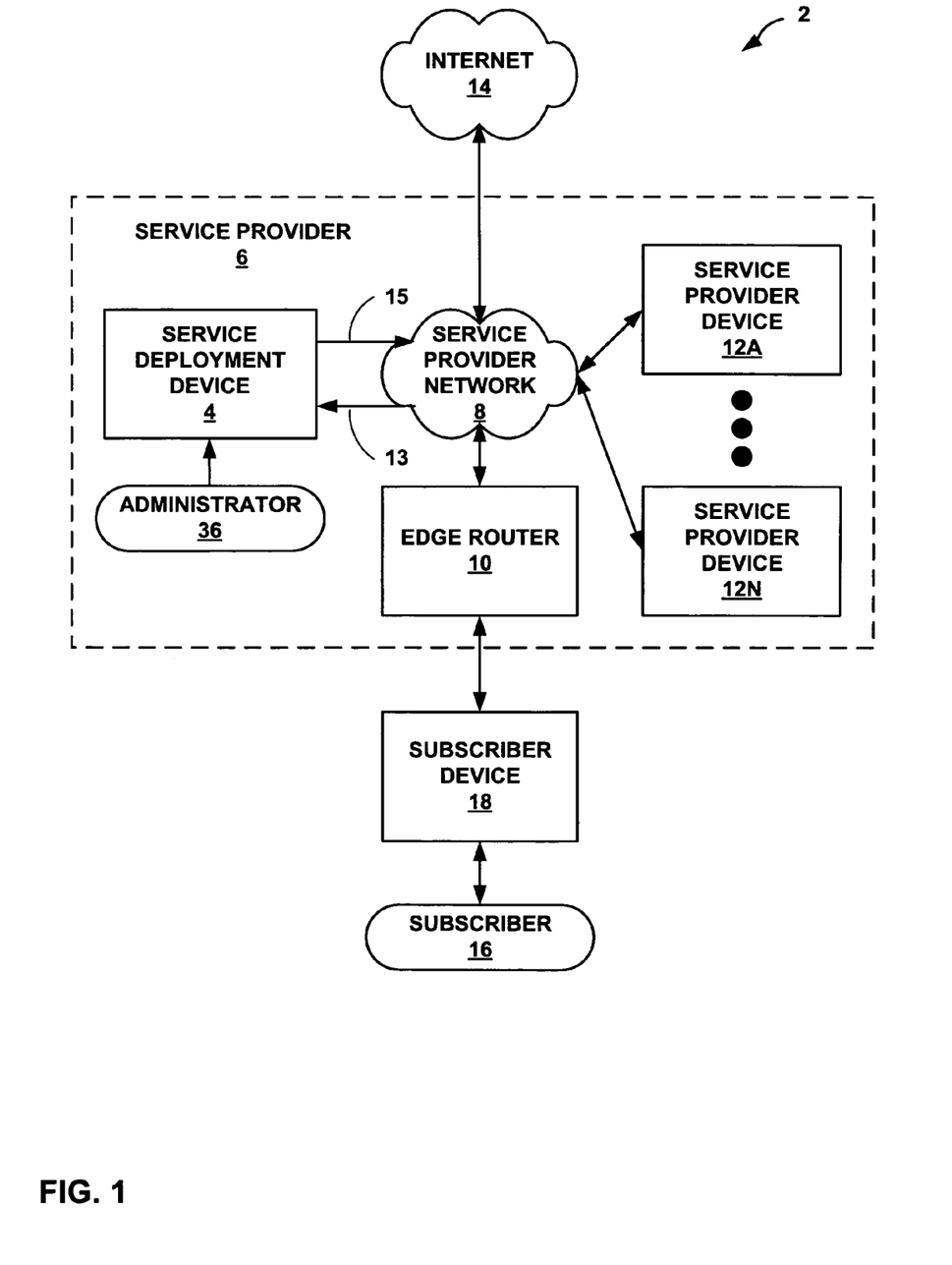
FIG. 1 is a block diagram illustrating an exemplary system in which a service provider employs a service deployment device (SDD) to effect business polices.

FIG. 1 is a block diagram illustrating an exemplary system 2 in which a service provider 6 employs a Service Deployment Device ("SDD") 4 to deploy business policies of service provider 6. In this exemplary embodiment, service provider 6 provides a subscriber 16 with access to Internet 14 via subscriber device 18. A service level agreement (SLA) or other service agreement may govern the relationship between service provider 6 and subscriber 16.

The service agreement typically contains terms of service specifying the rights and duties of service provider 6 and subscriber 16. The terms of this contract constitute business policies of service provider 6 relative to subscriber 16. For example, service provider 6 and subscriber 16 may enter a service agreement wherein service provider 6 supplies subscriber 16 with one thousand minutes of Internet access per month at a cost of $20. Alternatively, service provider 16 may agree to allow subscriber 16 to transfer up to 100 gigabytes to and from Internet 14 per month at a cost of $30 per month. As described herein, service provider 6 uses SDD 4 to specify and provide automated or semi-automated enforcement of such business policies with respect to subscriber 16. For exemplary purposes, the functions of SDD 4 are described in reference to a single subscriber 16. However, it is to be understood that the functions can readily be applied to large customer bases.

To access Internet 14, subscriber 16 directs subscriber device 18 to send network communications to an edge router 10 or other access means associated with service provider 6. Edge router 10 may then forward the network communications to Internet 14 or service provider devices 22A through 22N (collectively, "service provider devices 22") via a service provider network 8. Service provider devices 22 may provide various services on behalf of subscriber 16. For example, service provider devices 22 may be authentication servers, virtual private network (VPN) servers, dynamic host configuration protocol (DHCP) servers, domain name servers (DNS), voice of Internet Protocol (VoIP) servers or other network devices. Edge router 10 may also forward the network communications directly to Internet 14.

When edge router 10 and service provider devices 12 process network communications on behalf of subscriber 16, edge router 10 and service provider devices 12 may generate and send network-level events 13 to SDD 4. SDD 4 may receive and process a wide variety of internally or externally generated events. For example, if service provider device 22A provides a subscriber authentication service, service provider device 22A may send a network event to SDD 4 when subscriber 16 successfully authenticates. In addition, service provider devices 12 may send events such as user log ins and log outs, bandwidth usage reports, assignments of network addresses, disconnections, unsuccessful authentication attempts, changes of user-specific data, network attack alerts, notices of performance degradations, and other network-level events. In this manner, network-level events 13 represent low-level events that represent the occurrence of specific network activity, operations or rendering of services. Edge router 10 and service provider devices 12 may use the common open policy service (COPS) protocol to send network events 13.

SDD 4 processes network events 13 to deploy and enforce business policies of service provider 6. For example, to enforce the one thousand minute limit in the service contract described above, SDD 4 may receive and process network events 13 from an authentication server indicating when subscriber 16 logs in and when subscriber 16 logs out. SDD 4 may then use these network events to determine whether subscriber 16 has exceeded one thousand minutes of Internet use. If subscriber 16 has used more than one thousand minutes of Internet access, SDD 4 may perform an action related to the Internet access service. For instance, SDD 4 may send instructions 15 to the authentication server to reject further authentication attempts by subscriber 16 and thus deny subscriber 16 further access to the Internet 14.

In one embodiment, SDD 4 applies a set of business logic rules to network events 13 to perform actions related to services provided by service provider 6. Specifically, an administrator 36 drafts business rules using a rule specification language. The rule specification language allows administrator 36 to specify a set of condition/action rules. Moreover, because the condition/action rules refer to business-level information, the condition/action rules embody business policies of service provider 6. Upon receiving an event, SDD 4 evaluates the condition of a condition/action rule. If SDD 4 determines that the condition is satisfied given the event, SDD 4 enables the action of the condition/action rule.

Continuing the above example, a condition enforcing the one thousand minute limit may utilize the number of minutes that subscriber 16 has spent on the Internet during the current month as an input variable. By way of contrast, this condition does not refer to subscriber logins and log outs that form the basis for calculating how many minutes subscriber 16 has used during the current month. Rather, the condition utilizes network-level information representing actual usage. Further, the rule specification language allows administrator 36 to draft conditions using arithmetic, Boolean, or other operators. For example, administrator 36 may combine elements of business-level information using addition, subtraction, "and", "or" operators, or other logical operators. In one embodiment, SDD 4 uses a forward-chaining rule-based algorithm, such as LEAP or RETE.

In some embodiments, the condition/action rules do not specify the manner in which the action is to be carried out by SDD 4, thereby allowing the condition/action rules to remain high level. Instead, in some embodiments, an action in a condition/action rule specifies an execution rule. The execution rules in turn provide details on how SDD 4 should perform an action. In particular, execution rules contain references to methods and parameters in described by interfaces. In addition, the execution rules contain references to implementations of the interfaces. Because execution rules only contain references to interfaces and implementations, administrator 36 need not understand the exact details of the implementation and execution.

In addition, the condition/action rules need not specify how SDD 4 translates network events 13 into the business-level information used in the conditions of the condition/action rules. For example, the condition/action rules need not specify how SDD 4 transforms network events specifying subscriber logins and logout into usage minutes. Rather, in some embodiments, a set of event translation rules control translation of events into business-level information before SDD 4 evaluates the condition/action rules, thereby providing another degree of abstraction. For example, each event translation rule may describe a set of source events and a script that converts the source events into business-level information.

SDD 4 and the rule specification language may present one or more advantages. For example, the rule specification language may simplify the process by which a service provider implements a business plan within a complex network environment. The rule specification language removes translation and execution details from the condition/action rules that describe the business plan. Removing such details may streamline the process of drafting the condition/action rules.

Moreover, by establishing a separate set of execution rules, the rule specification language allows administrator 36 to easily change designation of software or hardware components that actually perform actions enabled under the condition/action rules. In this way, the rule specification language allows administrator 36 to prescribe a very wide range of behaviors for SDD 4 without administrator 36 needing to understand the intricacies of various network technologies. Thus, administrator 36 may create condition/action rules that start, stop, or alter network services, impose limitations on services, restrict user bandwidth, change network configurations, alter user-specific data such as account balances, send text messages to cell phones, place telephone calls, send faxes, and update databases without having detailed knowledge with respect to the interfaces or implementation of any of these technologies. By creating condition/action rules and appropriate pluggable software modules that implement the actions, SDD 4 allows an enterprise to efficiently deploy to a network a great diversity of business policies.

In addition, writing condition/action rules with a business level rule specification language may reduce the programming burden on administrator 36 because the administrator can think in terms of business policies instead of implementation details. At the same time, software programmers do not need to concern themselves with business goals while writing processors. Because the programmers do not need to tailor the processors to specific business goals, the processors may be reusable in other applications. Such a division of labor is efficient and may yield results that suit the needs of the enterprise better. In addition, condition/action rules drafted in the rule specification language are focused on business goals rather than implementation details, the condition/action rules may require less programming and less debugging. Moreover, because the rule specification language is not specific to a particular technology or device provider, rules drafted in the business-level rule specification language do not need to change as the enterprise changes or upgrades its devices.

Figure 2:
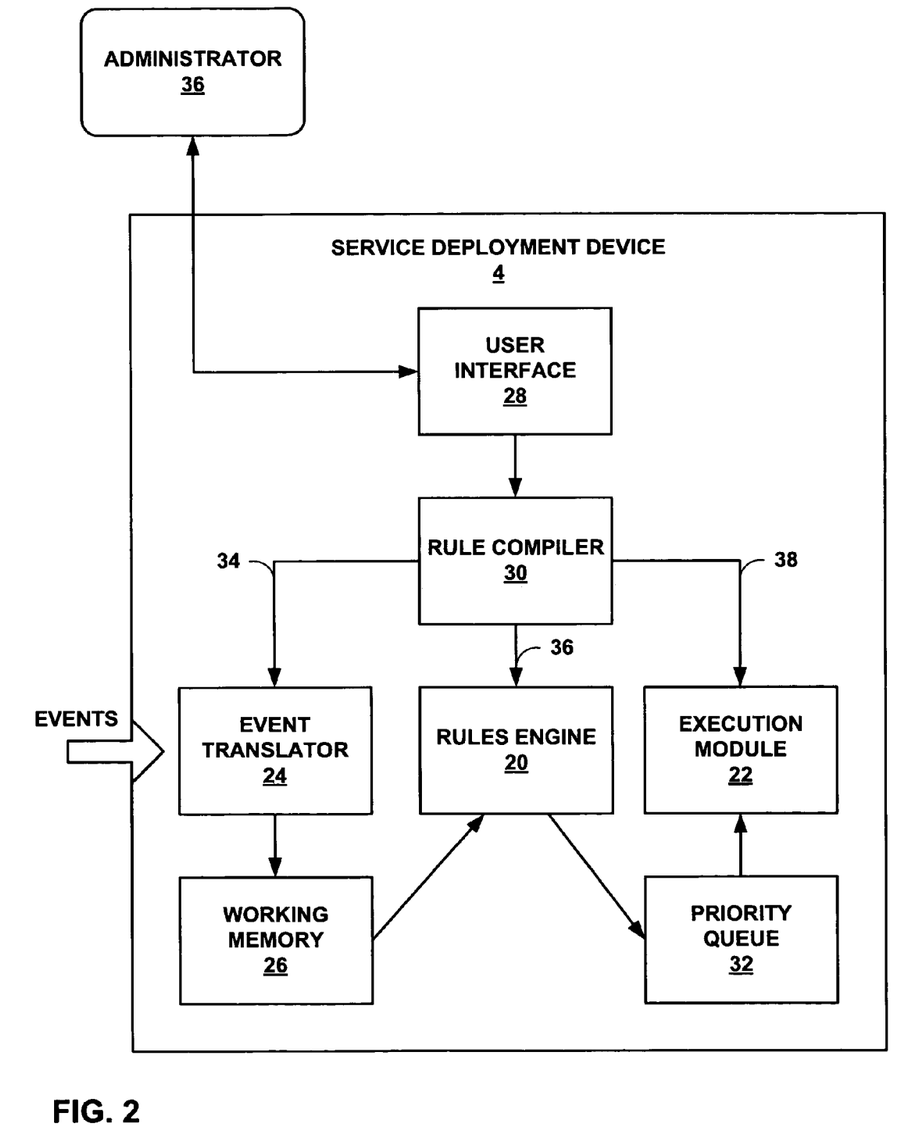
FIG. 2 is a block diagram illustrating an exemplary embodiment of the SDD (FIG. 1).

FIG. 2 is a block diagram illustrating an exemplary embodiment of a service deployment device ("SDD") 4. As explained above, SDD 4 applies custom business logic rules to perform actions in response to events 13. In this example embodiment, SDD 4 comprises a rules engine 20, an execution module 22, an event translator 24, a working memory 26, an administrative interface 28, a rule compiler 30, and a priority queue 32. The various components of SDD 4 may be implemented in hardware, firmware, software or any combination thereof. Aspects implemented in software may be embodied as instructions executable by one or more processors, such as a microprocessor, microcontroller or digital signal processor (DSP). Aspects implemented in hardware may be implemented by discrete or integrated logic circuitry, such as an application specific integrated circuit (ASIC), field programmable gate array (FPGA), and associated memory.

Administrator 36 interacts with SDD 4 through administrative interface 28 to supply custom business logic rules drafted in a rule description language. For example, administrator 36 enters a set of event translation rules 34, a set of condition/action rules 36, and a set of execution rules 38. After administrator 36 finishes entering the business logic rules, rule compiler 30 compiles the business logic rules. Rule compiler 30 outputs the compiled condition/action rules 36 to rules engine 20. In addition, rule compiler 30 sends compiled event translation rules 34 to event translator 24. Further, rule compiler 30 provides compiled execution rules 38 to execution module 22.

In the rule specification language, event translation rules 34 transform events to business-level information. Each event translation rule provides event translator 24 with a "source event" attribute and a "translation" attribute. A "source event" attribute of an event translation rule instructs event translator 24 whether an event triggers the application of the event translation rule. In particular, the "source event" attribute is an expression that returns true or false, depending on attributes associated with the event. A "translation" attribute instructs event translator 24 what business-level information the event pertains to and how to translate the event into that business-level information. Specifically, the "translation" attribute may describe an expression or invoke a script. This expression may use data stored in working memory 26 or elsewhere.

When event translator 24 receives events, event translator 24 applies event translation rules 34 to generate business-level information in response to the events. Specifically, event translator 24 uses the "source event" attribute of an event translation rule to determine whether the events trigger the event translation rule. If the events trigger the event translation rule, event translator 24 evaluates the expression specified by the "translation" attribute of the event translation rule. After evaluating the "translation" attribute, event translator 24 transfers the resulting business-level information into working memory 26. Thus, working memory 26 stores business-level information that reflects received events. For example, suppose that event translation rules 34 contain the following rule:
  event_translation.reduce_quota.events=SESSION_
    UPDATE;
  event_translation.reduce_quota.translation=
    User.RemainingQuota=User.RemainingQuota−SES-
    SION_UPDATE.session_duration Translated, this event translation rule instructs event translator 24 to set the User.RemainingQuota value in working memory 26 equal to the difference between the current value of User.RemainingQuota and the duration of the session described in the SESSION_UPDATE event.

In the rule specification language, each condition/action rule provides rules engine 20 with a condition and a list of references to action descriptors that may be enabled when the condition is satisfied. For example, a condition/action rule comprises a "condition" attribute, an "actions" attribute, and a "priority" attribute. Rules engine 20 evaluates a condition of a rule in set of condition/action rules 36 and enables an action associated with the rule when the condition is satisfied. In particular, the "condition" attribute of a condition/action rule describes an expression that evaluates to true or false. Rules engine 20 evaluates the expression when rules engine 20 detects that the business-level information in working memory 26 has changed. The expression may refer to business-level information stored in working memory 26. For example, in the rule description language a "NoQuota" condition/action rule may specify a "condition" attribute as
  C_A_Rule.NoQuota.Condition=
    User.RemainingQuota<=0 &&
    User.Role=="Subscriber"

Translated, this expression is true if and only if there exists a user who has remaining quota less and or equal to zero and the user is a subscriber.

When the expression of the "condition" attribute of a condition/action rule evaluates to true, rules engine 20 inserts references to action descriptors specified by the "actions" attribute of the condition/action rule into priority queue 32. In addition to the action descriptor, rules engine 20 includes a reference to the context of the action descriptor in priority queue 32. The context may describe the original event that triggered the rule and a reference to the subscriber associated with the action descriptor. In this way, rules engine 20 enables an action when a condition associated with the action is satisfied. For example, in the rule description language the "NoQuota" condition/action rule may specify the following as an "actions" attribute:
C_A_Rule.NoQuota.Actions=StopInternetService,SendAlertEmail. Thus, when the remaining quota of a user is less than zero and the user is a subscriber, rules engine 20 inserts references to the "StopInternetService" and the "SendAlertEmail" action descriptors with associated contexts into priority queue 32.

Rules engine 20 uses the "priority" attribute of a condition/action rule to determine where to insert a reference to an action descriptor in priority queue 32. Rules engine 20 places references to action descriptors with higher priority, i.e., lower number, closer to the beginning of priority queue 32. For example, the "NoQuota" condition/action rule may specify the following priority: C_A_Rule.NoQuota.Priority=2. In this example, rules engine 20 places the reference to the "StopInternetService" action descriptor in front of all references with greater priority numbers.

Put together, a complete condition/action rule may appear in the rule description language as follows:
  C_A_Rule.NoQuota.Condition=
    User.RemainingQuota<=0 &&
    User.Role=="Subscriber"
  C_A_Rule.NoQuota.Actions=StopInternetService,Sen-
    dAlertEmail
  C_A_Rule.NoQuota.Priority=2

In the rule description language, execution rules 38 define how execution module 22 handles the execution details of the actions enabled by rules engine 20. Specifically, execution rules 38 contain action descriptors and processor descriptors. In general, an action descriptor provides execution module 22 with a reference to a processor descriptor and attributes that instruct the execution module how to use the processor descriptor. A processor descriptor provides execution module 22 with a reference to a processor class and attributes that instruct the execution module how to configure the processor class.

Execution module 22 applies the set of execution rules 38 to execute actions enabled by rules engine 22. Specifically, when execution module 22 detects that there is a reference to an action descriptor in priority queue 32, execution module 22 removes the reference from the front of priority queue 32. Execution module 22 then locates an action descriptor in execution rules 38 that corresponds to the reference. Next, execution module 22 uses the action descriptor to locate a processor descriptor and invoke a method. In particular, each action descriptor provides execution module 22 with a processor attribute, a method attribute, a set of parameter attributes, and an error condition attribute.

The "processor" attribute of an action descriptor specifies a processor descriptor. As described in detail below, a processor descriptor specifies a location of processor class that implements a set of related methods. For instance, a processor descriptor "Service Activation Proxy" may specify a processor class that implements methods related to activating, deactivation, or altering network services available to a user. In the rule description language an action descriptor may specify the "Service Activation Proxy" processor descriptor as Action.StopInternetService.Processor=ServiceActivationProxy.

The "method" attribute of an action descriptor informs execution module 22 which method of the processor class to invoke. The set of "parameter" attributes instruct execution module 22 which values to use with the method. The "parameter" attributes may refer to values checked in a condition. For example, suppose that the processor class referenced by the "ServiceActivationProxy" processor descriptor has a method called "StopService" that takes a parameter that names which service to stop and the name of the subscriber. In this case, an action descriptor invoking this method may appear as:

Action.StopInternetService.Method=StopService
Action.StopInternetService.Parameter.serviceName=
Internet
Action.StopInternetService.Parameter.useName=User.
Username When execution module 22 receives compiled execution rules 38 from rule compiler 30, execution module 22 uses processor descriptors to locate and initialize processor classes. In particular, execution module 22 locates a processor class specified by a "class" attribute in a processor descriptor. For example, the "class" attribute may specify a Windows or UNIX pathname, a universal resource locator, lightweight directory access protocol address, a path within a software library, or some other method that directs execution module 22 to a processor class. For instance, Processor.ServiceActivationProxy.class=net.enterprise. processor.ServiceActivationProxy specifies that execution engine 22 may find the "ServiceActivationProxy" processor class at net.enterprise.processor.ServiceActivationProxy.

In addition to instructing execution module 22 where to find a processor class, a processor descriptor contains attributes that instruct execution module 22 how to configure the processor class. For example, a ServiceActivationProxy processor class may have two variables: DNS_Server and DHCP_Server. When execution module 22 initializes the ServiceActivationProxy processor class, execution module 22 provides values for the DNS_Server and the DHCP_Server variables. In the rule description language of this embodiment, administrator 36 may specify such values as:

Processor.ServiceActivation-
  Proxy.DNS_Server=125.125.125.001
Processor.ServiceActivation-
  Proxy.DHCP_Server=125.125.125.002

Figure 3:
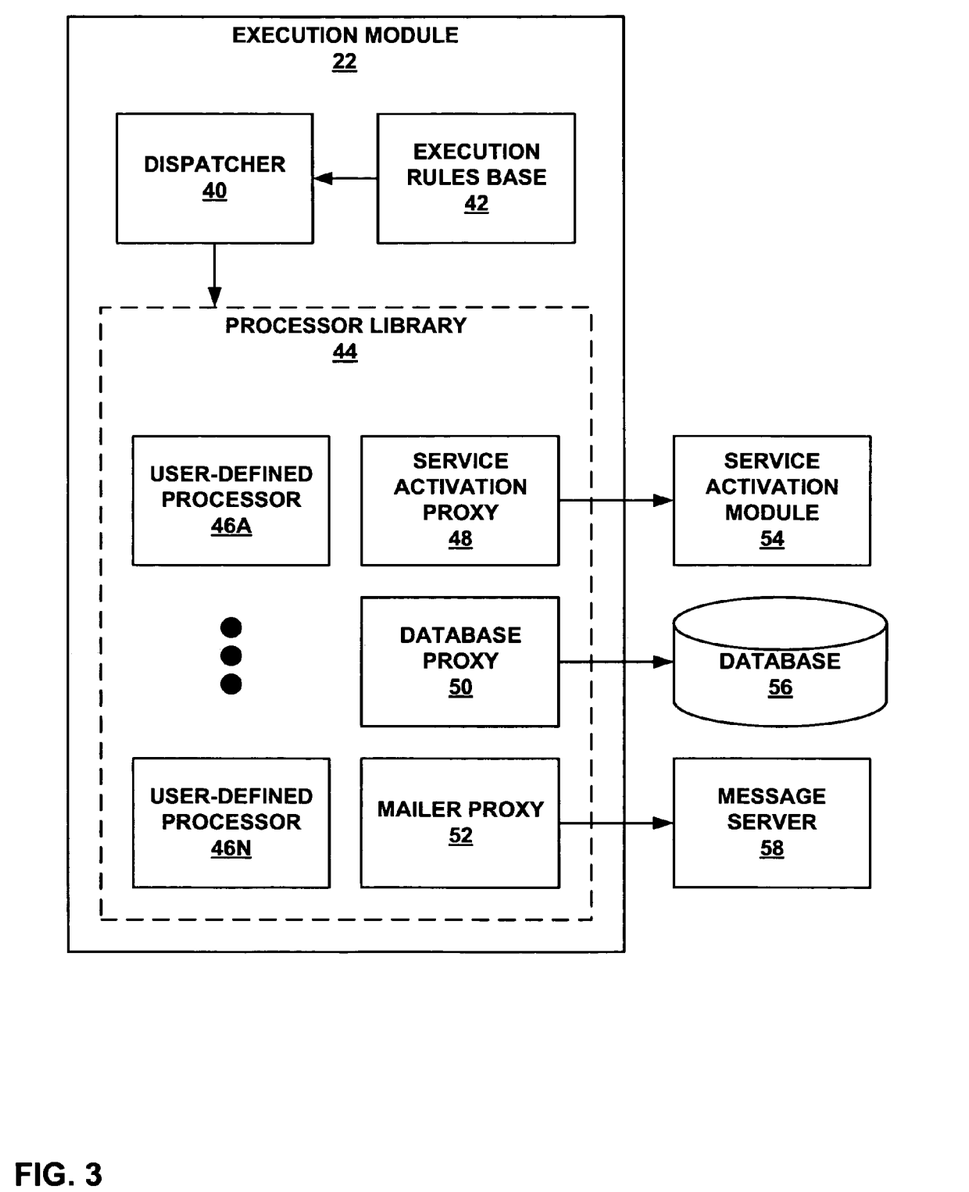
FIG. 3 is a block diagram illustrating an exemplary embodiment of an execution module of the SDD.

FIG. 3 is a block diagram illustrating an exemplary embodiment of execution module 22. As discussed above, execution module 22 uses execution rules 38 to handle the execution details of the actions enabled by rules engine 20. In this embodiment, execution module 22 includes an execution rules base 42 and a dispatcher 40 that interacts with a processor library 44. Execution rules base 42 contains the set of execution rules 38 compiled by rule compiler 30.

Dispatcher 40 periodically checks priority queue 32 to determine whether priority queue 32 contains any enabled actions, i.e., references to action descriptors. If priority queue 32 contains a reference to an action descriptor, dispatcher 40 removes the reference from the head of priority queue 32. Dispatcher 40 then retrieves an action descriptor from execution rules base 42. Dispatcher 40 uses a reference provided by the "processor" attribute of the retrieved action descriptor to locate a processor descriptor in execution rules base 42. Dispatcher 40 then locates a processor class in processor library 44 specified by the processor descriptor. After locating the processor class, dispatcher 40 invokes the method specified by the action descriptor with the parameters specified by the action descriptor.

Processor library 44 comprises one or more processor classes. In this embodiment, processor library 44 includes a database proxy 50, a service activation proxy 48, a mailer proxy 52, and a set of user-defined processors 46A through 46N (collectively user-defined processors 46). Each processor class is a pluggable software module containing one or more related methods or attributes. For example, a processor class may be an object described by an object-oriented programming language such as Java™ or C++. Processor library 44 may or may not be stored within execution module 22 or within SDD 4. Because the "class" attribute of the processor descriptor may contain a URL or other identifier, the processor classes of processor library 44 may be scattered throughout service provider network 8.

Database proxy 50 contains methods that retrieve information from and store information in a database 56. Specifically, the methods of database proxy 50 may include methods to reduce account balances, replenish depleted balances, suspend available services, and so on. In this way, SDD 4 may generate and store records describing user accounts, records of network sessions, account balances, and the like. These records may contain information related to the type of agreement entered into between a user and a network service provider. For instance, a record may contain information about how much money remains in the account of subscriber 16 or whether subscriber 16 is under penalty for violating a term of service. Because the methods of database proxy 50 may change what services should be available to a subscriber, database proxy 50 may generate a new event. Database proxy 50 may then send the new event to event translator 24. For this reason, database 56 may act as working memory 26.

Service activation proxy 48 contains methods relating to a service activation module ("SAM") 54 that controls network services. In particular, SAM 54 may receive service requests from devices 12, edge router 10, service provider network 8, and subscriber device 18. When SAM 54 receives certain requests, SAM 54 sends events to SDD 4. The business logic rules may instruct SDD 4 to use service activation proxy 48 to respond to events by sending commands back to SAM 54. SAM 54 then performs the commands sent by SDD 4. For example, SAM 54 might receive a request from subscriber 16 seeking access to the Internet. SAM 54 may then send an event to SDD 4. If rules engine 20 of SDD 4 enables an action allowing subscriber 16 to access the Internet, execution module 22 may invoke a method of service activation proxy 48 that sends instructions 15 to SAM 54 to open an Internet session. Further, SAM 54 may execute instructions 15 by sending device instructions to devices 12. The device instructions may cause devices 12 to activate requested services, refuse to activate the requested services, or activate the requested services with limitations.

Mailer proxy processor 70 contains methods that cause a message server 78 to generate electronic messages. For example, mailer proxy processor 70 may contain methods that cause message server 78 to send e-mail, short message service messages, or messages to captive web applications. These messages may contain warnings about account balances or violations of service terms. User-defined processor classes 72 contain whatever other methods are necessary to carry out the business goals of the enterprise. For example, user-defined processor class 72A may contain methods that generate and send fax messages.

Figure 4:
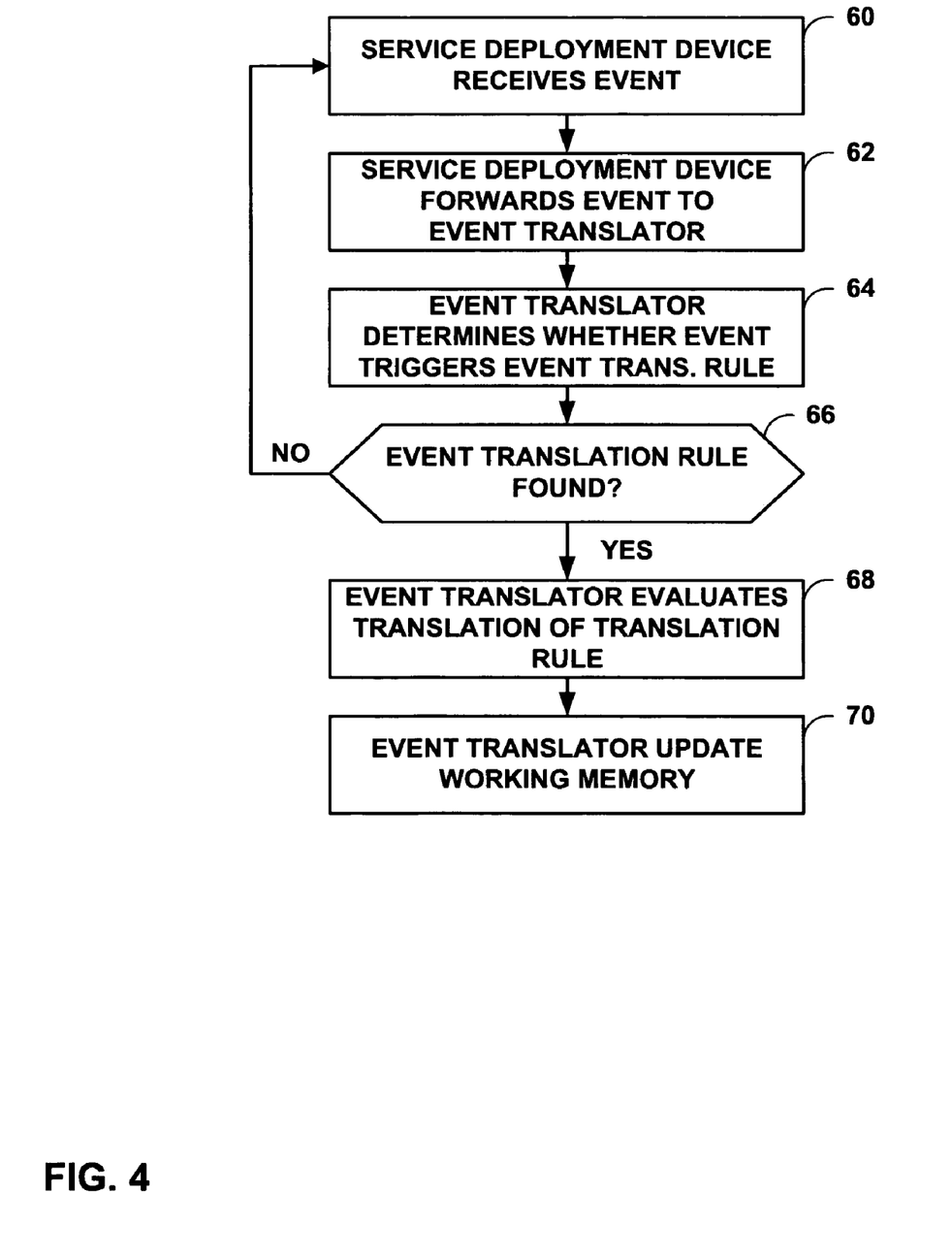
FIG. 4 is a flowchart illustrating an exemplary operation of the SDD and an event translator in accordance with the principles of this invention.

FIG. 4 is a flowchart illustrating an exemplary operation of SDD 4 and, in particular, event translator 24 of SDD 4, in accordance with the principles of this invention. Initially, SDD 4 receives an event (60). SDD 4 may receive this event from one of devices 12 on network 8 or SDD 4 may have generated the event internally. Upon receiving the event, SDD 4 internally forwards the event to event translator 24 (62).

When event translator 24 receives the event, the event translator determines whether the event triggers an event translation rule (64). In particular, event translator 24 may scan through event translation rules 34 to determine whether the event matches any of the events listed in an "events" attribute of an event translation rule. If event translator 24 cannot find an event translation rule whose "events" attribute matches the event attribute matches the event (NO of 66), the event translator waits until SDD 4 receives another event (60). On the other hand, if event translator 24 finds such an event translation rule (YES of 66), event translator 24 evaluates the "translation" attribute of the event translation rule (68). Event translator 24 then updates working memory 26 with the results of the evaluation (70).

Figure 5:
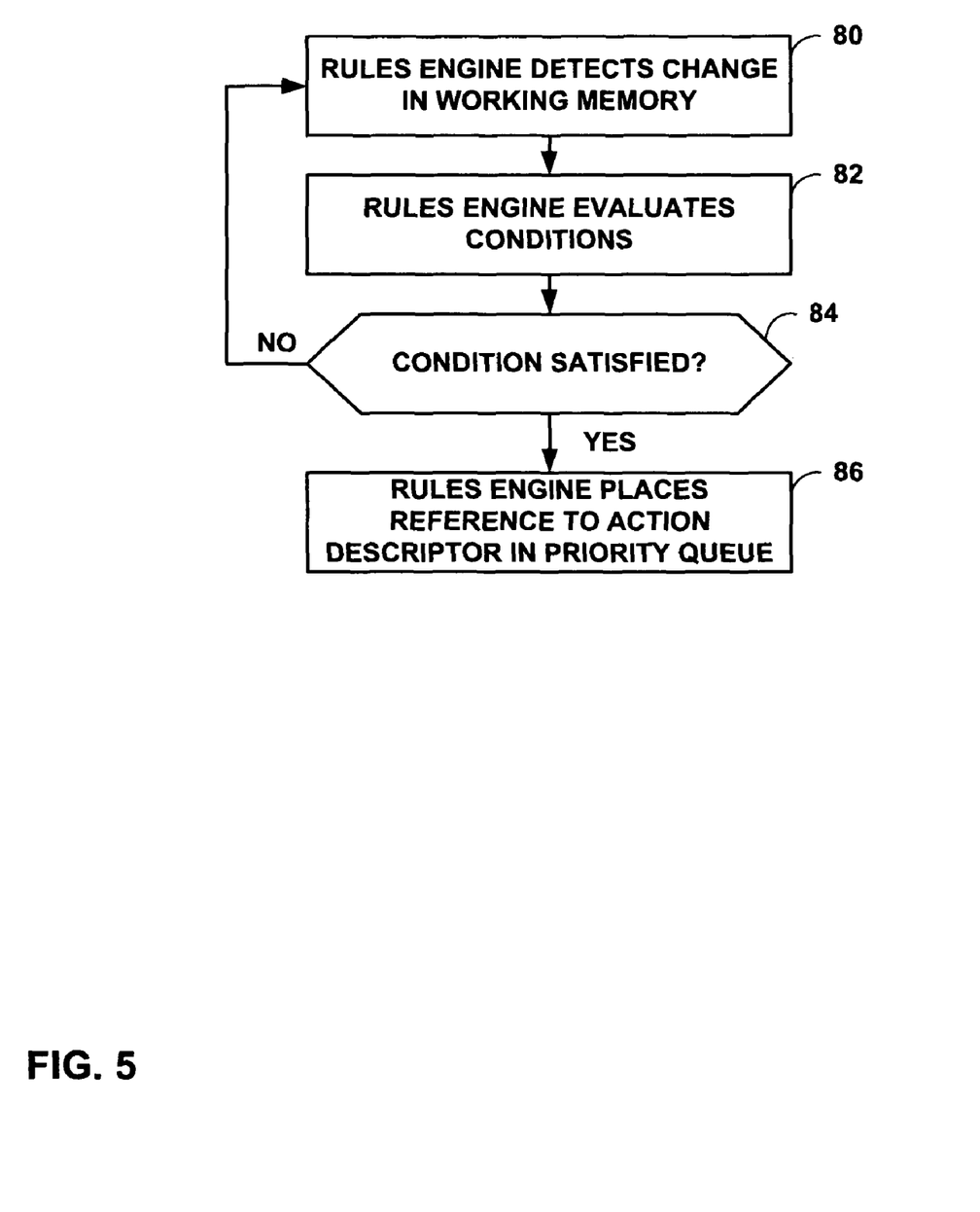
FIG. 5 is a flowchart illustrating an exemplary operation of a rules engine in accordance with the principles of this invention.

FIG. 5 is a flowchart illustrating an exemplary operation of rules engine 20 of SDD 4 in accordance with the principles of this invention. Rules engine 20 begins a condition/action rule processing cycle when the rules engine detects a change in working memory 26 (80). When rules engine 20 detects a change in working memory 26, rules engine 20 evaluates the expressions described in the "condition" attributes of condition/action rules (82). For example, rules engine 20 may use a forward-chaining algorithm to evaluate the "condition" attributes.

If the change in working memory 26 did not cause a "condition" attribute of a condition/action rule to be satisfied (84), rules engine 20 waits until working memory 26 changes again (80). Else, if the change in working memory 26 causes the "condition" attribute of a condition/action rule to be satisfied, rules engine 20 enables the actions specified by the "actions" attribute of the condition/action rule (86). That is, rules engines 20 places references to action descriptors named in the "actions" attribute of the condition/action rule in priority queue 32. In particular, rules engine 20 places the reference in the appropriate position according to the priority specified by the condition/action rule.

Figure 6:
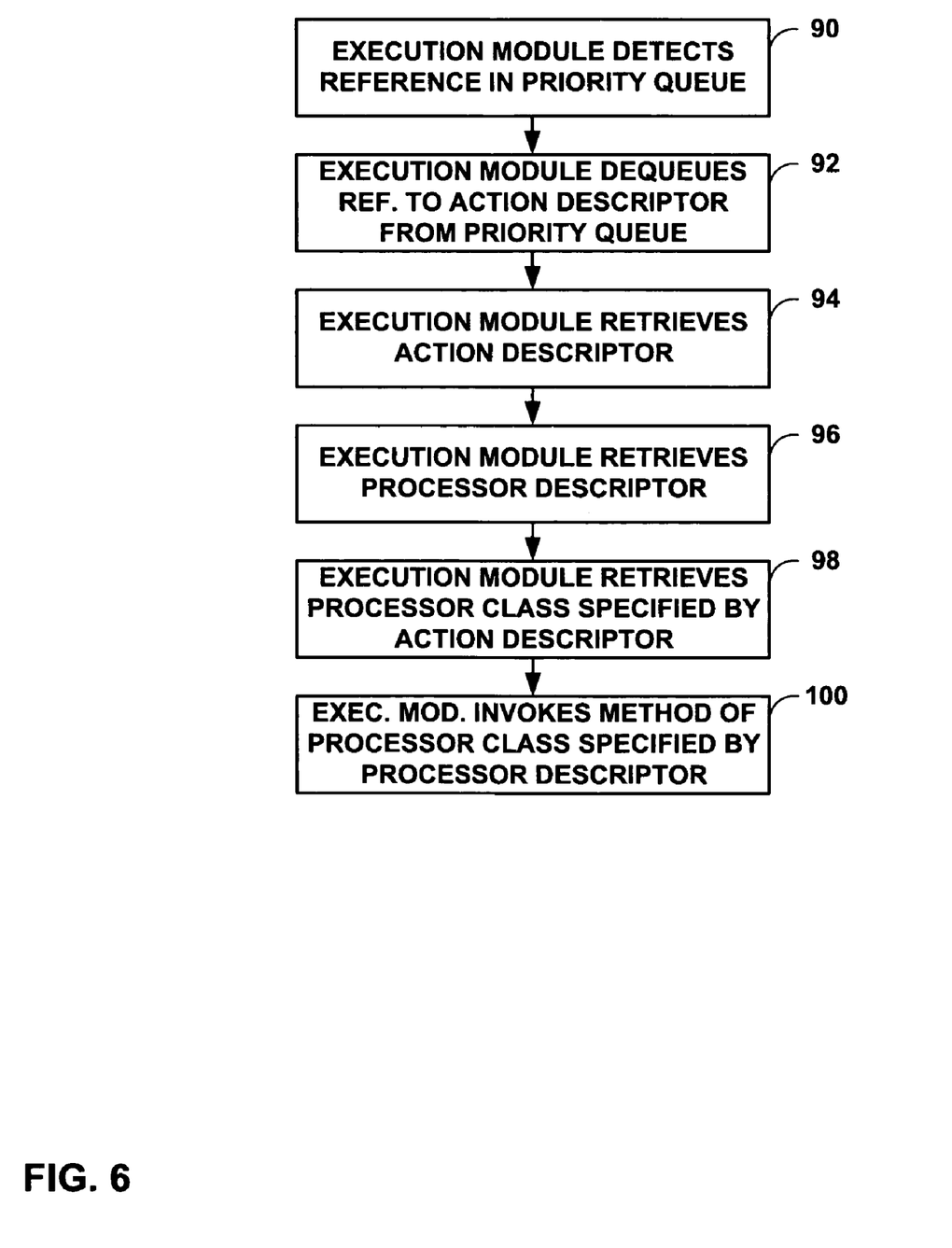
FIG. 6 is a flowchart illustrating an exemplary operation of an execution module in accordance with the principles of this invention.

FIG. 6 is a flowchart illustrating an exemplary operation of execution module 22 of SDD 4 in accordance with the principles of this invention. Execution module 22 begins an action execution cycle when dispatcher 40 detects that there is a reference to an action descriptor in priority queue 32 (90). Upon detecting the reference, dispatcher 40 dequeues the reference at the head of priority queue 32 (92). Dispatcher 40 then retrieves an action descriptor corresponding to the reference from execution rules base 42 (94). Dispatcher 40 then examines the "processor" attribute of the retrieved action descriptor to retrieve a processor descriptor from execution rules base 42 (96). Next, dispatcher 40 uses the "class" attribute of the retrieved processor descriptor to retrieve a processor class (98). Upon retrieving the processor class, dispatcher 40 invokes a method of the processor class specified by a "method" attribute of the action descriptor. In particular, dispatcher 40 uses the set of "parameter" attributes to supply input to the method (100).

Various embodiments of the invention have been described. For example, a system has been described in which a Service Deployment Device receives business logic rules organized as event-translation rules, condition/action rules, and execution rules, each of which possesses one or more attributes. Nevertheless, various modifications and alterations may be made without departing from the spirit of this invention. For example, other embodiment may format the business logic rules in different ways. In addition, the Service Deployment Device has been described as a freestanding device. However, the Service Deployment Device may be incorporated into any other network device such as a firewall, router, network acceleration device, session border controller, or Virtual Private Network server. These and other embodiments are within the scope of the following claims.

The invention claimed is:

1. A method comprising:
receiving, with a service deployment device, a set of business logic rules defined in terms of high-level business information as an initial set of rules, wherein the set of business logic rules embody business policies of a network service provider, and wherein the business policies govern a group of relationships between the network service provider and one or more subscribers;
processing, with the service deployment device, the initial set of rules into a first set of rules, a second set of rules, and a third set of rules, wherein the first set of rules comprise event translation rules that control translation of network-level events into business-level information for evaluation of conditions, the second set of rules comprise condition rules that enable actions when certain conditions are met, and the third set of rules comprise execution rules that define how an execution module of the service deployment device executes the actions enabled by the condition rules;
receiving, with the service deployment device, network-level events from one or more network devices associated with the network service provider;
in response to the network-level events, applying the set of event translation rules, with an event translator of the service deployment device, to the network-level events to generate business-level information for evaluation of a condition, wherein each event translation rule includes a translation attribute, and wherein the event translator evaluates an expression specified by the translation attribute to generate the business-level information;
evaluating, with a rules engine of the service deployment device, the business-level information with one or more conditions specified by the set of condition rules, wherein one or more actions are enabled by the rules engine when at least one of the one or more conditions is satisfied; and
performing, with the execution module of the service deployment device, the one or more actions enabled by the rules engine by at least applying the set of execution rules to the network-level events, wherein the one or more actions are related to services provided by the network service provider.

2. The method of claim 1, wherein evaluating comprises applying a forward-chaining algorithm to the set of rules.

3. The method of claim 1, further comprising:
   storing the business-level information in a working memory,
   wherein, when the rules engine detects that the business-level information in the working memory has changed, the rules engine evaluates the one or more conditions.

4. The method of claim 1, further comprising:
   maintaining a sequence of actions enabled by the rules engine;
   ordering the enabled actions according to priorities associated with the execution rules; and
   executing the enabled actions according to the ordering.

5. The method of claim 1, wherein applying the set of execution rules comprises:
   storing processor classes in a processor library;
   retrieving action descriptors from the execution rules corresponding to actions enabled for execution, wherein each of the action descriptors includes a reference to a processor descriptor and a set of attributes that instruct the execution module how to use the processor descriptor;
   locating processor descriptors in the set of execution rules based on the action descriptors, wherein the processor descriptors include a reference to a processor class and attributes that instruct the execution module how to configure the processor class;
   locating processor classes in the processor library based on the processor descriptors; and
   invoking methods of the processor classes specified by the enabled actions.

6. The method of claim 5, wherein storing the processor classes comprises storing pluggable software modules containing one or more related methods or attributes.

7. The method of claim 5, wherein storing the processor classes comprises storing a service activation proxy that contains methods that control network services.

8. The method of claim 5, wherein storing the processor classes comprises storing a database proxy that contains methods that retrieve information from and store information to a database.

9. The method of claim 8, further comprising storing a record specific to a user of services provided by an operator in the database.

10. The method of claim 1, wherein performing actions related to services comprises sending commands based on the responses to the network-level events to a service activation module that controls network services.

11. The method of claim 10, further comprising sending device instructions from the service activation module to the network devices to cause the network devices to activate the requested services, refuse to activate the requested services, or activate the requested services with limitations.

12. The method of claim 1, wherein performing actions comprises commanding one or more of the network devices to send electronic messages to one or more users.

13. The method of claim 1, wherein performing actions comprises commanding one or more of the network devices to redirect a user to a specified web page.

14. The method of claim 1, wherein performing actions comprises granting or denying access to a service, or placing restrictions on the service.

15. The method of claim 1, wherein performing actions comprises commanding one or more of the network devices to alter or terminate a service for a user when the condition rules indicate that the user has violated a term of a service agreement.

16. The method of claim 1, wherein the initial set of rules are encoded in a rule specification language.

17. The method of claim 1, wherein the network service provider is an Internet Service Provider.

18. The method of claim 1, wherein the services include a service selected from the group of an authentication service, a dynamic host configuration protocol service, and domain name server service.

19. The method of claim 1, wherein the business policies include a term of service limiting a subscriber to a number of minutes of access to a service provided by the network service provider in a given time period.

20. The method of claim 1, wherein the business policies include a term of service limiting a subscriber to an amount of data transferred through a service provided by the network service provider in a given time period.

21. A system comprising:
   a plurality of physical network devices coupled to a network that generate network-level events; and
   a physical service deployment device that applies an initial set of rules to the network-level events to initiate actions related to services provided by a network service provider, wherein the initial set of rules are defined in terms of high-level business information and represent business policies of the network service provider, wherein the business policies govern a group of relationships between the network service provider and one or more subscribers, and wherein the service deployment device comprises:
      a rule compiler that processes the initial set of rules into a set of event translation rules, a set of condition rules, and a set of execution rules, wherein the set of event translation rules control translation of the network-level events into business level information for evaluation of conditions, the set of condition rules enable actions, and the set of execution rules define how an execution module of the service deployment device executes the actions enabled by the set of condition rules;
      an event translator that applies the set of event translation rules to generate business-level information in response to the network-level events, wherein each event translation rule of the set of event translation rules includes a translation attribute, and wherein the event translator evaluates an expression specified by the translation attribute to generate the business-level information;
      a rules engine that evaluates the conditions specified by the set of condition rules and enables actions associated with the set of condition rules when one or more of the conditions are satisfied; and
      an execution module that controls the execution of the actions enabled by the rules engine by applying the set of execution rules to the network-level events, wherein the one or more actions are related to services provided by the network service provider.

22. The system of claim 21, wherein the rules engine uses a forward-chaining algorithm to process the rules.

23. The system of claim 21, wherein the conditions specified by the condition rules are defined in terms of business-level information.

24. The system of claim 21, wherein the service deployment device further comprises:
   a working memory that stores the business-level information,
   a forward-chaining rules engine detects that the business-level information in the working memory has changed and evaluates the condition upon detecting the change.

25. The system of claim 21, wherein the service deployment device further comprises:
   a priority queue that maintains a sequence of actions enabled by the rules engine;
   wherein, the enabled actions are ordered according to priority, and wherein, the execution module executes the enabled actions in the sequence maintained by the priority queue.

26. The system of claim 25, wherein the execution module comprises:
   a processor library that contains processor classes; and
   a dispatcher that retrieves action descriptors from the set of execution rules corresponding to the enabled actions, wherein each of the action descriptors includes a reference to a processor descriptor and a set of attributes that instruct the execution module how to use the processor descriptor, locates processor descriptors in the set of execution rules based on the action descriptors, wherein the processor descriptors include a reference to a processor class and attributes that instruct the execution module how to configured the processor class, locates processor classes in the processor library based on the processor descriptors, and invokes methods of the processor classes specified by the action descriptors.

27. The system of claim 26, wherein each of the processor classes is a pluggable software module containing one or more related methods or attributes.

28. The system of claim 26, wherein the processor library includes a service activation proxy that contains methods that control network services.

29. The system of claim 26, wherein the processor library includes a database proxy that contains methods that retrieve information from and store information in a database.

30. The system of claim 29, wherein the database contains files specific to users of services provided by an operator of the system.

31. The system of claim 21, further comprising:
   a service activation module that receives commands from the service deployment device,
   wherein the service activation module controls network services in a manner consistent with the commands.

32. The system of claim 31, wherein the service activation module sends device instructions to the network devices, wherein the device instructions cause the network devices to activate the requested services, refuse to activate the requested services, or activate the requested services with limitations.

33. The system of claim 21, wherein the service deployment device responds to the events by commanding one or more of the network devices to send electronic messages to one or more users.

34. The system of claim 21, wherein the service deployment device responds to the events by commanding one or more of the network devices to redirect a user to a specified web page.

35. The system of claim 21, wherein the service deployment device responds to the events by granting or denying access to a service or by placing restrictions on the service.

36. The system of claim 21, wherein the service deployment device commands at least one of the network devices to alter or terminate a service for a user when the rules indicate that the user has violated a term of service agreement.

37. The system of claim 21, wherein the initial set of rules are encoded in a rule specification language.

38. The system of claim 21, wherein the network service provider is an Internet Service Provider.

39. The system of claim 21, wherein the services include a service selected from the group of an authentication service, a dynamic host configuration protocol service, and domain name server service.

40. The system of claim 21, wherein the business policies include a term of service limiting a subscriber to a number of minutes of access to a service provided by the network service provider in a given time period.

41. The system of claim 21, wherein the business policies include a term of service limiting a subscriber to an amount of data transferred through a service provided by the network service provider in a given time period.

42. A non-transitory computer-readable storage medium having computer code encoded thereon comprising instructions for causing a programmable processor to:
   receive a set of business logic rules defined in terms of high-level business information as an initial set of rules, wherein the business logical rules embody business policies of a network service provider, and wherein the business policies govern a group of relationships between the network service provider and one or more subscribers;
   process the initial set of rules into a first set of rules, a second set of rules, and a third set of rules, wherein the first set of rules comprise event translation rules that control translation of the events into business-level information for evaluation of conditions, the second set of rules comprise condition rules and the third set of rules comprise execution rules that define how an execution module of the service deployment device executes the actions enabled by the condition rules;
   receive network-level events from a plurality of network devices associated with one of the network service provider;
   apply the set of event translation rules to the network-level events to generate business-level information in response to the network-level events for evaluation of a condition, wherein each event translation rule of the set of event translation rules includes a translation attribute that specifies an expression, and wherein the business-level information is generated by at least evaluating the expression specified by the translation attribute;
   evaluate the business-level information with one or more conditions specified by the set of condition rules, wherein one or more actions are enabled when at least one of the one or more conditions is satisfied; and
   perform the one or more enabled actions by applying the set of execution rules to the network-level events, wherein the one or more enabled actions are related to services provided by the network service provider.

43. The computer-readable storage medium of claim 42, wherein the instructions cause the processor to use a forward-chaining algorithm to evaluate the condition.

* * * * *

UNITED STATES PATENT AND TRADEMARK OFFICE
CERTIFICATE OF CORRECTION

PATENT NO. : 7,962,633 B1  
APPLICATION NO. : 11/249227  
DATED : June 14, 2011  
INVENTOR(S) : Sidebottom et al.

Page 1 of 1

It is certified that error appears in the above-identified patent and that said Letters Patent is hereby corrected as shown below:

On the Title Page, Item (75) Inventor Name reads "Siu Jin Foong" should read --Sui Jin Foong-- as evidenced by the Executed Declaration Signed and Sealed this  
Twentieth Day of December, 2011

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,962,633 B1 | |
| APPLICATION NO. | : 11/249227 | |
| DATED | : June 14, 2011 | |
| INVENTOR(S) | : Sidebottom et al. | |

It is certified that error appears in the above-identified patent and that said Letters Patent is hereby corrected as shown below:

Column 13, line 28 (claim 16): "to configured the" should be -- to configure the --

Column 14, lines 42-43 (claim 42): "service provider;" should be -- service providers; --

Signed and Sealed this
Thirteenth Day of March, 2012

David J. Kappos
*Director of the United States Patent and Trademark Office*